United States Patent
Rivers

(10) Patent No.: US 10,382,486 B2
(45) Date of Patent: Aug. 13, 2019

(54) EVENT INTEGRATION FRAMEWORKS

(71) Applicant: Tripwire, Inc., Portland, OR (US)

(72) Inventor: Stephen Rivers, Crowthorne (GB)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 13/631,611

(22) Filed: Sep. 28, 2012

(65) Prior Publication Data

US 2014/0096181 A1    Apr. 3, 2014

(51) Int. Cl.
*G06F 17/00* (2019.01)
*H04L 29/06* (2006.01)
*G06F 21/55* (2013.01)
*G06F 21/60* (2013.01)

(52) U.S. Cl.
CPC ............ *H04L 63/20* (2013.01); *G06F 21/552* (2013.01); *G06F 21/604* (2013.01)

(58) Field of Classification Search
CPC ......... H04L 63/20; H04W 12/00; G06F 21/30
USPC ............................. 726/1, 30, 3; 709/225, 226
See application file for complete search history.

(56) References Cited

U.S. PATENT DOCUMENTS

| | | | |
|---|---|---|---|
| 6,735,701 B1 * | 5/2004 | Jacobson | H04L 29/06 726/1 |
| 7,243,348 B2 | 7/2007 | Good et al. | |
| 7,316,016 B2 | 1/2008 | DiFalco | |
| 7,360,099 B2 | 4/2008 | DiFalco et al. | |
| 7,523,053 B2 * | 4/2009 | Pudhukottai | G06Q 40/02 705/30 |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 7,966,187 B1 * | 6/2011 | Pettay | G10L 15/26 704/270 |
| 8,005,709 B2 * | 8/2011 | King et al. | 705/7.36 |

(Continued)

OTHER PUBLICATIONS

Kim et al., "Experiences with Tripwire: Using Integrity checkers for Intrusion Detection," *Computer Science Technical Reports*, Report No. 94-012, 15 pp. (Mar. 1994).

(Continued)

*Primary Examiner* — Lynn D Feild
*Assistant Examiner* — Viral S Lakhia
(74) *Attorney, Agent, or Firm* — Klarquist Sparkman, LLP

(57) ABSTRACT

Disclosed herein are representative embodiments of methods, apparatus, and systems for processing and managing information from a compliance and configuration control ("CCC") tool and generating information for a security information and event management ("SIEM") tool based on the information from the CCC tool. For example, in one exemplary embodiment, information from a CCC tool is transferred to a SIEM tool or logging tool by receiving the information from the CCC tool in a format that is not recognized by the SIEM tool or logging tool, and generating an output message in a message format that is recognized by the SIEM tool or logging tool. In particular embodiments, the message format is a customizable message format that is adaptable to multiple different SIEM tools or logging tools. In further embodiments, the data transferred to the SIEM tool comprises data indicative of compliance policy changes.

12 Claims, 10 Drawing Sheets

(56) References Cited

U.S. PATENT DOCUMENTS

| | | | | |
|---|---|---|---|---|
| 8,032,392 | B2* | 10/2011 | Brennan | G06Q 10/06 705/1.1 |
| 8,046,704 | B2* | 10/2011 | Santos et al. | 715/764 |
| 8,140,635 | B2 | 3/2012 | DiFalco | |
| 8,176,158 | B2 | 5/2012 | DiFalco et al. | |
| 8,396,838 | B2* | 3/2013 | Brockway et al. | 707/662 |
| 8,566,823 | B2 | 10/2013 | Wagner et al. | |
| 8,600,996 | B2 | 12/2013 | Good et al. | |
| 8,615,423 | B1* | 12/2013 | Hernandez | G06Q 10/067 705/7.37 |
| 8,819,491 | B2 | 8/2014 | Whitlock et al. | |
| 8,843,435 | B1* | 9/2014 | Trefler | G06F 17/30607 707/600 |
| 8,862,941 | B2 | 10/2014 | Whitlock et al. | |
| 8,868,987 | B2 | 10/2014 | Wagner | |
| 8,875,129 | B2 | 10/2014 | Wagner et al. | |
| 8,914,341 | B2 | 12/2014 | DiFalco | |
| 8,955,038 | B2* | 2/2015 | Nicodemus | G06F 11/3495 726/1 |
| 8,996,684 | B2 | 3/2015 | Good et al. | |
| 9,026,646 | B2 | 5/2015 | Whitlock et al. | |
| 9,209,996 | B2 | 12/2015 | DiFalco | |
| 9,256,841 | B2 | 2/2016 | DiFalco et al. | |
| 2005/0229001 | A1* | 10/2005 | Brown | G06F 21/604 713/182 |
| 2006/0010047 | A1* | 1/2006 | Minor | 705/30 |
| 2006/0224742 | A1* | 10/2006 | Shahbazi | 709/226 |
| 2006/0242277 | A1 | 10/2006 | Torrence et al. | |
| 2007/0043786 | A1 | 2/2007 | DiFalco et al. | |
| 2007/0124255 | A1 | 5/2007 | DiFalco et al. | |
| 2007/0143851 | A1* | 6/2007 | Nicodemus et al. | 726/25 |
| 2007/0192867 | A1* | 8/2007 | Miliefsky | H04L 63/20 726/25 |
| 2008/0254763 | A1* | 10/2008 | Brink | H04M 3/2281 455/405 |
| 2010/0095235 | A1* | 4/2010 | Bennett | G06Q 99/00 715/781 |
| 2011/0004917 | A1* | 1/2011 | Saisa et al. | 726/1 |
| 2011/0099255 | A1* | 4/2011 | Srinivasan | H04L 41/0866 709/221 |
| 2011/0138038 | A1 | 6/2011 | Good et al. | |
| 2011/0289588 | A1* | 11/2011 | Sahai | G06Q 90/00 726/25 |
| 2011/0302629 | A1* | 12/2011 | Whitson | G06F 21/6218 726/3 |
| 2012/0023076 | A1 | 1/2012 | Torrence et al. | |
| 2012/0080520 | A1* | 4/2012 | Kochevar | G06Q 10/06 235/382 |
| 2012/0102543 | A1* | 4/2012 | Kohli | H04L 63/20 726/1 |
| 2012/0158573 | A1* | 6/2012 | Crocker | G06Q 40/02 705/38 |
| 2012/0173443 | A1* | 7/2012 | Gerashchenko et al. | 705/317 |
| 2012/0185952 | A1* | 7/2012 | Jandhyala et al. | 726/30 |
| 2012/0259722 | A1* | 10/2012 | Mikurak | 705/26.1 |
| 2012/0326858 | A1* | 12/2012 | Daly | H04W 4/90 340/522 |
| 2013/0054601 | A1 | 2/2013 | Whitlock et al. | |
| 2013/0073704 | A1 | 3/2013 | Whitlock et al. | |
| 2013/0205365 | A1* | 8/2013 | Choi et al. | 726/1 |
| 2013/0226662 | A1* | 8/2013 | LeVine et al. | 705/7.32 |
| 2013/0247136 | A1* | 9/2013 | Chieu et al. | 726/1 |
| 2013/0263206 | A1* | 10/2013 | Nefedov | G06F 21/6218 726/1 |
| 2014/0053145 | A1 | 2/2014 | Steigleder | |
| 2014/0082620 | A1 | 3/2014 | Wagner et al. | |
| 2014/0096181 | A1 | 4/2014 | Rivers | |

OTHER PUBLICATIONS

Kim et al., "The Design and Implementation of Tripwire: A File System Integrity Checker," *Computer Science Technical Reports*, Report No. 93-071, 23 pp. (Nov. 1993).

* cited by examiner

EVENT INTEGRATION FRAMEWORKS

FIELD

This application relates generally to the field of security information and event management in an information technology ("IT") infrastructure.

SUMMARY

Disclosed below are representative embodiments of methods, apparatus, and systems for processing and managing information from a compliance and configuration control ("CCC") tool and generating information for a security information and event management ("SIEM") tool based on the information from the CCC tool. The disclosed methods, apparatus, and systems should not be construed as limiting in any way. Instead, the present disclosure is directed toward all novel and/or nonobvious features and aspects of the various disclosed embodiments, alone or in various combinations and subcombinations with one another.

Among the example embodiments disclosed herein is a computer-implemented method comprising: inputting compliance data indicating a compliance status of one or more nodes in an information technology ("IT") network relative to one or more compliance policies; inputting historical compliance data, the historical compliance data indicating the compliance status of the one or more nodes in the IT network at an earlier time; computing compliance change data from the compliance data and the historical compliance data, the compliance change data comprising data indicative of the degree of compliance changes between the compliance data and the historical compliance data; and generating an output message in a message format adapted for use with a security information and event management ("SIEM") tool or logging tool, the output message including the compliance change data.

Another example embodiment disclosed herein is a computer-implemented method comprising: transferring information from a compliance and configuration control ("CCC") tool to a security information and event management ("SIEM") tool or logging tool, wherein the CCC tool monitors multiple nodes in an information technology ("IT") infrastructure, and wherein the transferring comprises: receiving the information from the CCC tool in a format that is not recognized by the SIEM tool or logging tool; and generating an output message in a message format that is recognized by the SIEM tool or logging tool, the message format of the output message further being a customizable message format that is adaptable to multiple different SIEM tools or logging tools.

A further embodiment among the example embodiments disclosed herein is a computer-implemented method, comprising: inputting compliance data indicating a compliance status of one or more nodes in an information technology ("IT") network relative to one or more compliance policies; determining a compliance trend for one or more nodes in the IT network by comparing the compliance data to historical compliance data, the historical compliance data indicating the compliance status of the one or more nodes in the IT network at a different time; and generating an output message for a SIEM or logging tool only if the compliance trend indicates that the one or more nodes are less compliant than indicated by the historical compliance data.

The foregoing and other objects, features, and advantages of the disclosed technology will become more apparent from the following detailed description, which proceeds with reference to the accompanying figures.

DETAILED DESCRIPTION

I. General Considerations

Figure 1:
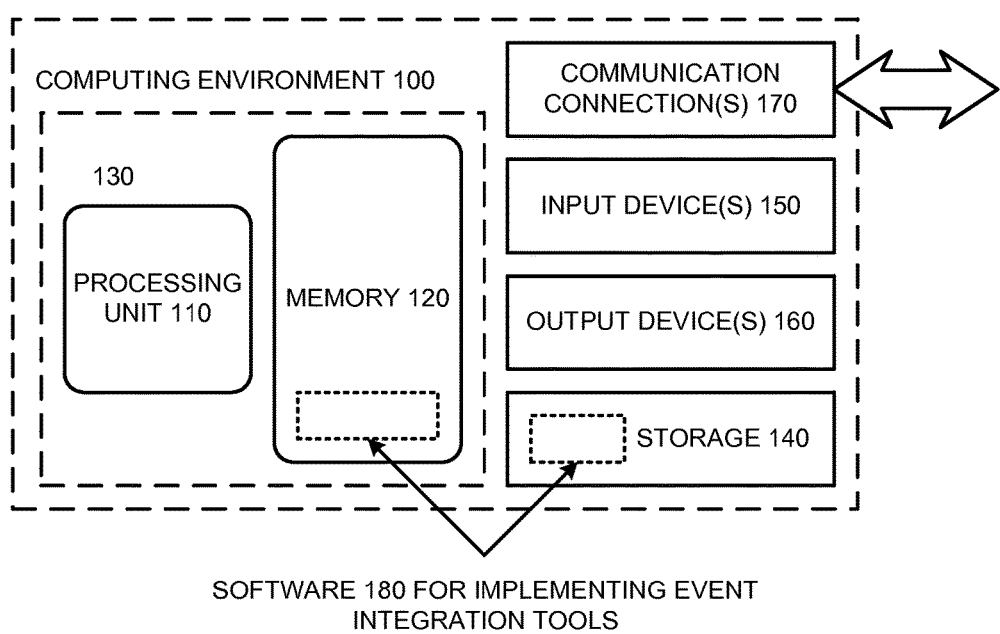
FIG. 1 is a block diagram illustrating a computing environment in which aspects of the disclosed technology can be performed.

Disclosed below are representative embodiments of methods, apparatus, and systems for processing and managing information from a compliance and configuration control ("CCC") tool and generating information for a SIEM tool based on the information from the CCC tool. The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine," "extract," and "compare," to describe the disclosed methods. These terms may be high-level abstractions of the actual operations that are performed. The actual operations that correspond to these terms may vary depending on the particular implementation and are readily discernible by one of ordinary skill in the art. Additionally, as used herein, the term "and/or" means any one item or combination of items in the phrase.

II. Example Computing Environments for Implementing Embodiments of the Disclosed Technology Any of the disclosed methods can be implemented as computer-executable instructions stored on one or more computer-readable media (e.g., non-transitory computer-readable media, such as one or more optical media discs, volatile memory components (such as DRAM or SRAM), or nonvolatile memory components (such as hard drives)) and executed on a computer (e.g., any commercially available computer, including desktop computers, servers, smart phones, tablet computers, netbooks, or other devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to an electrical device having a suitable display device.

FIG. 1 illustrates a generalized example of suitable computing hardware 100 with which several of the described embodiments can be implemented. The computing hardware 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing hardware 100 includes at least one processing unit 110 and memory 120. In FIG. 1, this most basic configuration 130 is included within a dashed line. The processing unit 110 executes computer-executable instructions. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two. The memory 120 stores software 180 implementing one or more of the described event integration embodiments for operating or using the disclosed technology. For example, the memory 120 can store software 180 for implementing any of the disclosed techniques described herein and their accompanying user interfaces.

The computing environment can have additional features. For example, the computing hardware 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 can be removable or non-removable, and includes magnetic disks, magnetic tapes or cassettes, CD-ROMs, DVDs, or any other tangible non-transitory non-volatile memory or storage medium which can be used to store information and which can be accessed within the computing environment 100. The storage 140 can also store instructions for the software 180 implementing any of the described techniques, systems, or environments.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, smartphone display, tablet display, netbook display, or touchscreen), printer, speaker, CD-writer, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media that can be accessed within or by a computing environment. By way of example, and not limitation, with the computing environment 100, computer-readable media include tangible non-transitory computer-readable media such as memory 120 and storage 140.

The various methods disclosed herein can also be described in the general context of computer-executable instructions, such as those included in program modules, being executed in a computing environment by a processor. Generally, program modules include routines, programs, libraries, objects, classes, components, data structures, and so on that perform particular tasks or implement particular abstract data types. The functionality of the program modules may be combined or split between program modules as desired in various embodiments. Computer-executable instructions for program modules may be executed within a local or distributed computing environment.

Figure 2:
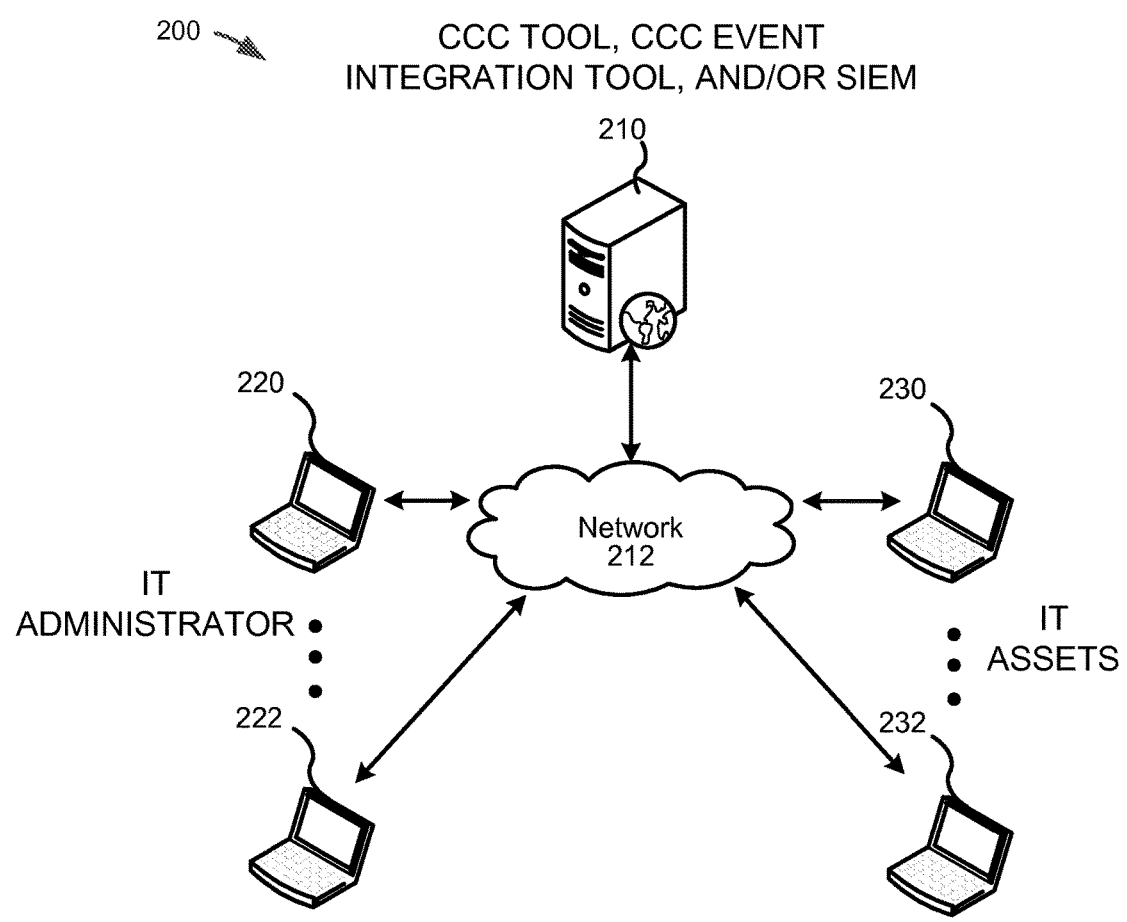
FIG. 2 is a block diagram showing a first exemplary network environment in which aspects of the disclosed technology can be performed.

An example of a possible network topology (e.g., a client-server network or cloud-based network) for implementing a system according to the disclosed technology is depicted in FIG. 2. Networked computing devices 220, 222, 230, 232 can be, for example, computers running a browser, plug-in, or other software that communicates with one or more central computers 210 (e.g., one or more servers in a cloud computing environment) via network 212. The computing devices 220, 222, 230, 232 and the central computer 210 can have computer architectures as shown in FIG. 1 and discussed above. The computing devices 220, 222, 230, 232 are not limited to traditional personal computers but can comprise other computing hardware configured to connect to and communicate with a network 212 (e.g., smart phones or other mobile computing devices, servers, network devices, dedicated devices, and the like).

In the illustrated embodiment, the computing devices 220, 222, 230, 232 are configured to communicate with one or more central computers 210 via a network 212 (e.g., using a cloud network or other client-server network). In certain implementations, the central computers 210 execute software for performing any of the disclosed compliance and configuration control functionalities, event integration functionalities, and/or security information and event management ("SIEM") functionalities, or software for computing any one or more of the intermediate or final values associated with the disclosed embodiments. The central computers 210 can transmit data to any of the computing devices 220, 222 (e.g., SIEM data to be displayed on a graphical user interface or web page at the computing devices 220, 222 or event integration tool data to be used by a SIEM at the computing devices 220, 222). For example, the computing devices 220, 222 (e.g., computing devices associated with an IT administer or with a SIEM) can receive data from the central computer 210 over the network 212. In order to provide the data, the one or more central computers 210 can receive and process data from the computing devices 230, 232 (e.g., computing devices or other devices associated with assets or nodes in the IT infrastructure administered by the IT administrator), which can store and/or transmit various types of configuration data used by the IT administrator. For example, the computing devices 230, 232 may store device configuration data, compliance policy data, change data, and/or other such data used by an IT compliance and configuration control tool (e.g., via a software agent). Alternatively, the one or more central computers 210 may themselves store the device configuration data, compliance policy, and other such IT data.

Figure 3:
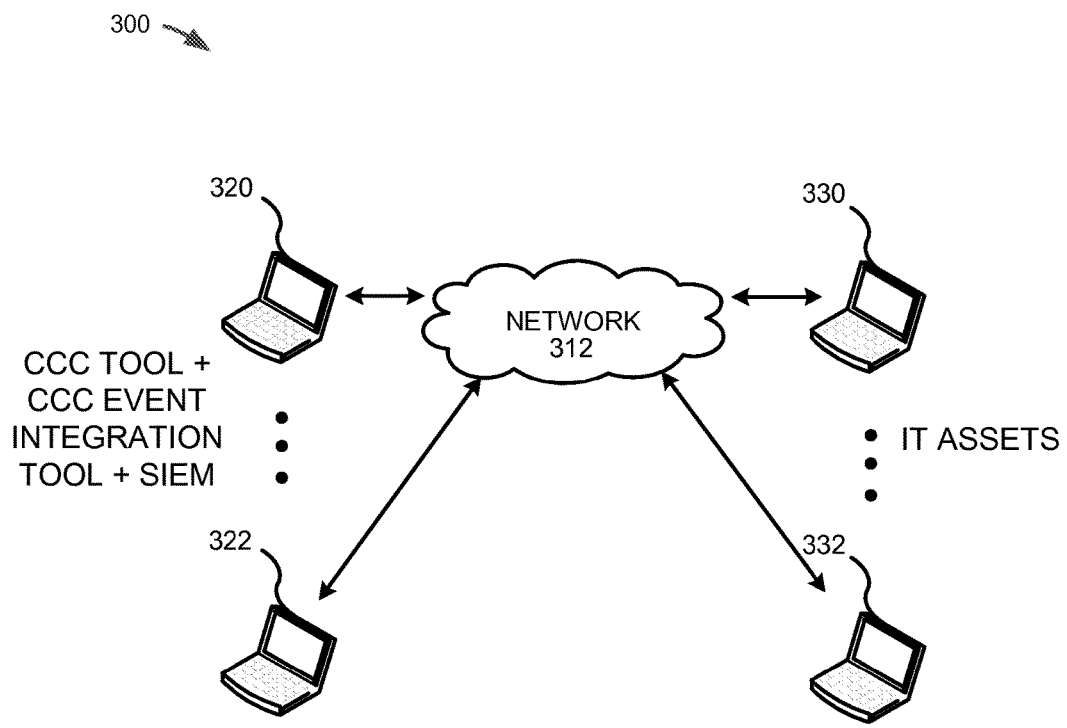
FIG. 3 is a block diagram showing a second exemplary network environment in which aspects of the disclosed technology can be performed.

Another example of a possible network topology for implementing a system according to the disclosed technology is depicted in FIG. 3. Networked computing devices 320, 322, 330, 332 can be, for example, computers running a browser or other software connected to a network 312. As above, the computing devices 320, 322, 330, 332 can have computer architectures as shown in FIG. 1 and discussed above. The computing devices 320, 322, 330, 332 are not limited to traditional personal computers but can comprise other computing hardware configured to connect to and communicate with a network 312 (e.g., smart phones or other mobile computing devices, servers, network devices, dedicated devices, and the like).

In the illustrated embodiment, the computing devices 320, 322 are configured to communicate directly with computing devices 330, 332 via the network 312. In the illustrated embodiment, the computing devices 320, 322 execute software for implementing any of the disclosed compliance and configuration control functionalities, event integration functionalities, and/or security information and event management functionalities, or software for computing any one or more of the intermediate or final values associated with the disclosed embodiments. The computing devices 320, 322 can use data obtained from the computing devices 330, 332 via the network 312. Any of the data received from the devices 330, 332, can be stored or displayed on any of the computing devices 320, 322 (e.g., displayed as data on a graphical user interface or web page at the computing devices 320, 322).

In the illustrated embodiments, the illustrated networks 212, 312 can be implemented as a Local Area Network ("LAN") using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the networks 212, 312 can be the Internet or a similar public network and operate using an appropriate protocol (e.g., the HTTP protocol).

III. Introduction to the Disclosed Technology

Described herein are methods, systems, and apparatus for extracting and processing information from a compliance and configuration control ("CCC") tool and generating information for a security information and event management ("SIEM") tool based on the information from the CCC tool. The disclosed technology can be used as part of (or in connection with) an IT management infrastructure for managing and monitoring one or more IT assets. In this disclosure, assets are also referred to as "nodes" or "devices". The IT nodes (assets or devices) can comprise, for example, servers, desktops, directory servers, hypervisors, databases, middleware applications, network devices, virtual infrastructures, and/or other such assets. In particular embodiments, the IT management infrastructure comprises a CCC tool, a SIEM tool, and an event integration tool. As more fully discussed below, the event integration tool can be configured to receive information from the CCC tool, parse and process the information, and generate messages for the SIEM tool based on the processed information.

The CCC tool can be used to detect, analyze, and report on change activity in an IT infrastructure. For example, the CCC tool can assess or receive configurations of the one or more nodes at one or more locations and determine whether the nodes comply with internal and external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The CCC tool can identify and validate changes to ensure these configurations remain in known and trusted states.

In particular implementations, the CCC tool operates by capturing a baseline of server file systems, desktop file system, directory servers, databases, virtual systems, middleware applications and/or network device configurations in a known good state. Ongoing integrity checks then compare the current states against these baselines to detect changes. The CCC tool collects information used to reconcile detected changes, ensuring they are authorized and intended changes. The CCC tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the CCC tool to automatically recognize desired changes and expose undesired changes.

The CCC tool can also generate one or more reports concerning the monitored nodes showing a wide variety of information (e.g., compliance information, configuration information, usage information, etc.) The compliance-related reports generated by the CCC tool can, in some instances, comprise a score for a node that indicates the relative compliance status of the node as a numerical value in a range of possible values (e.g., a score of 1 to 100 or other such numeric or alphabetical range). The CCC tool can also apply a set of one or more tests to the nodes to evaluate the compliance status of one or more nodes. In such embodiments, the compliance-related reports generated by the CCC tool can include the number of devices that passed a particular test as well as the number of devices that failed the test. Further, the CCC tool can store detected change event data in an event log or transmit the event data as soon as it is detected or shortly after it is detected. Event logs typically comprise a list of activities and configuration changes at nodes of the IT network.

An exemplary CCC tool that is suitable for use with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

A SIEM tool can be used to centralize the storage and interpretation of events, logs, or compliance reports observed and generated in an IT management infrastructure. The event, log, and compliance report information is typically produced by other software running in the IT network. For example, CCC tools generate events that are typically kept in event logs or stored in compliance reports, as discussed above. The SIEM can be used to provide a consistent central interface that an IT administrator can use to more efficiently monitor and manage activity and configuration changes in an IT network. As needed, the IT administrator can access and use the CCC tool, which may provide deeper information than that provided by the SIEM. A SIEM tool can also integrate with external remediation, ticketing, and/or workflow tools to assist with the process of incident resolution. Furthermore, certain SIEMs include functionality for generating reports that help satisfy regulatory requirements (e.g., Sarbanes-Oxley, PCI-DSS, GLBA, or any other such requirement or standard such as any of those listed above). For these reasons, SIEM tools are becoming more widely adopted by IT administrators who desire to use a single, centralized interface for monitoring and managing their increasingly complex IT infrastructures.

Logging tools can operate similarly to SIEM tools. Accordingly, for any of the embodiments disclosed below, a logging tool may take the place of a SIEM tool. For ease of readability, however, reference will typically be made to just a SIEM tool.

In certain embodiments of the disclosed, an event integration tool is used in connection with the IT management infrastructure. As more fully discussed below, the event integration tool can help integrate information from a CCC tool with a SIEM tool. For example, embodiments of the disclosed event integration techniques can be used to send change and/or compliance information from the CCC tool to a SIEM tool and compute additional information for the SIEM tool related to the change and/or compliance information. In particular implementations, the event integration tool provides a flexible output mechanism that allows a user or support engineer to customize the output from the CCC tool in an easy and robust manner.

IV. Example Event Integration Embodiments

Embodiments of the disclosed technology comprise an event integration tool that operates together with a CCC tool and a SIEM (or logging) tool. The event integration tool is configured to receive information from the CCC tool, to process the information (e.g., by filtering certain portions of the received information and/or analyzing the data for trends or significant changes), and to send the data to the SIEM tool for use and possible presentation to a user. Embodiments of the disclosed event integration technology are designed to send change and compliance information from the CCC tool to any logging or SIEM tool. In particular implementations, the event integration tool is flexible and can be adapted for use with a wide variety of logging or SIEM tools. For instance, in certain implementations and as more fully explained below, the event integration tool can search for and analyze information according to user-specified or support-engineer-specified instructions.

Figure 4:
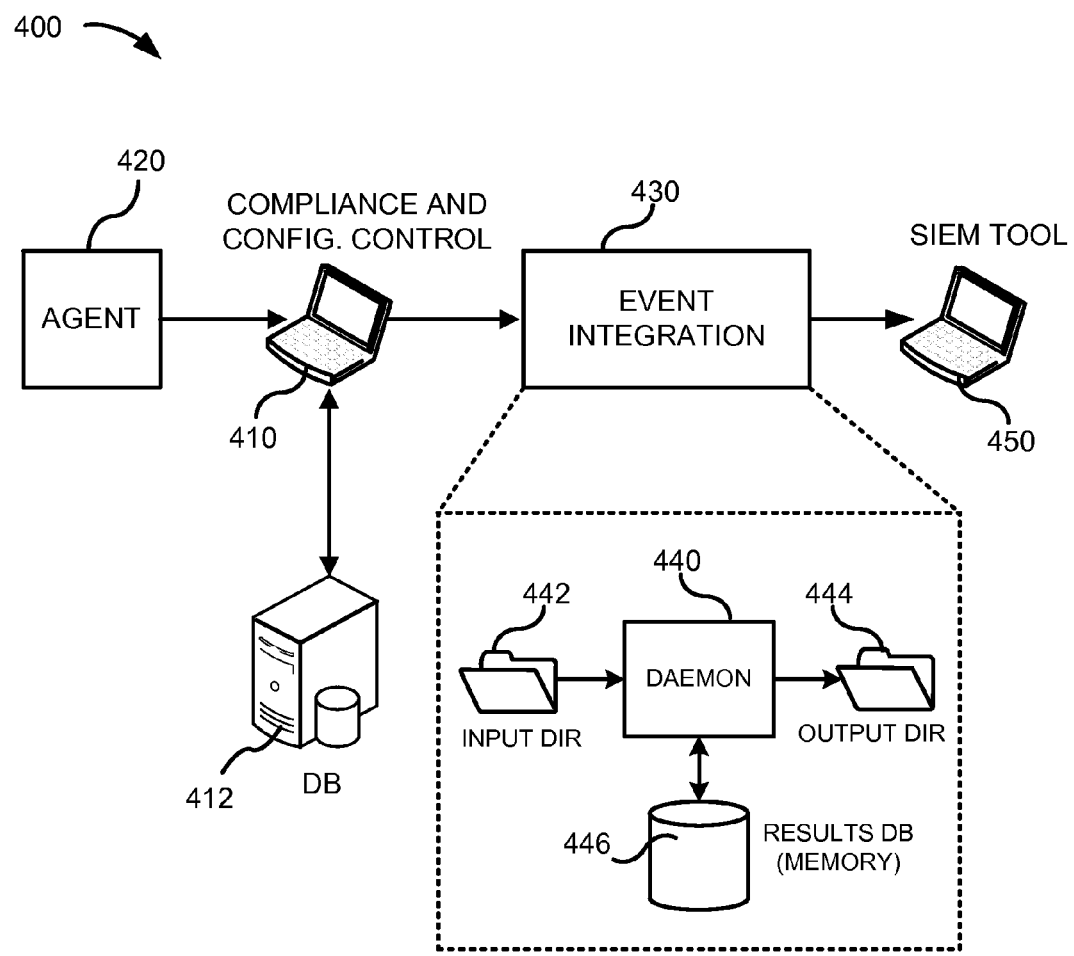
FIG. 4 is a block diagram of an exemplary event integration framework for analyzing and alerting a SIEM tool to changes at one or more nodes that impact a compliance policy.
Figure 5:
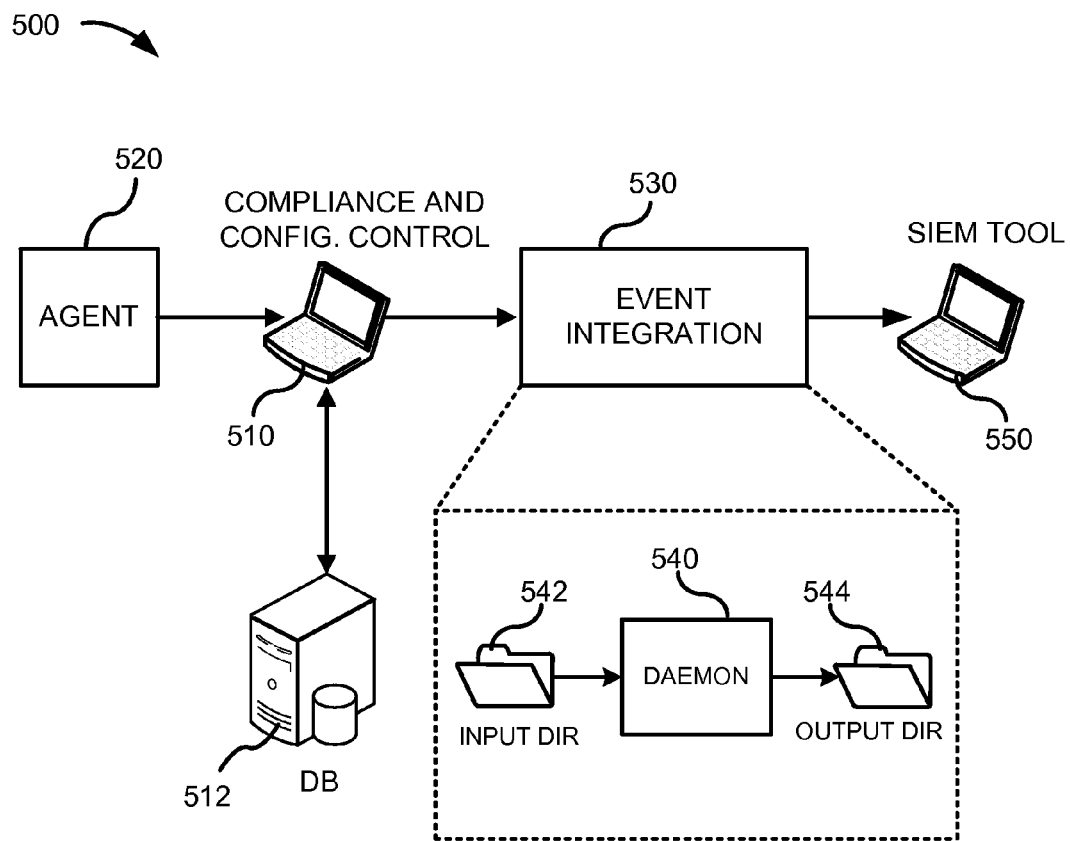
FIG. 5 is a block diagram of an event integration framework for analyzing and alerting a SIEM tool to changes that impact a file or folder at a node.

FIGS. 4 and 5 illustrate two exemplary event integration frameworks for implementing embodiments of the disclosed technology. In particular, FIG. 4 is a block diagram of an event integration framework 400 for analyzing and alerting the SIEM tool to changes at one or more nodes that impact a compliance policy. FIG. 5 is a block diagram of an event integration framework 500 for analyzing and alerting the SIEM to changes that impact a file or folder at a node. The two frameworks in FIGS. 4 and 5 can be part of a common framework, but are shown separately to illustrate the components used in each particular scenario. The two scenarios are discussed in greater detail below.

A. Exemplary Policy Compliance Alerting Frameworks

The event integration framework 400 in FIG. 4 comprises a CCC tool 410, which typically corresponds to a software tool (e.g., Tripwire Enterprise) running on a server or console of an IT administrator for monitoring a network of IT nodes. The CCC tool 410 communicates with a CCC database 412 that is used to store a variety of information for supporting the CCC tool (e.g., compliance policies, baseline information, and/or a data structure for storing information about currently monitored and managed nodes). The CCC console 410 is also in communication with one or more node agents, which typically comprise software agents running at individual nodes in the monitored IT network and which are configured to detect changes and send appropriate change messages to the CCC tool. A representative node agent 420 is shown in FIG. 4, though it should be understood that, in practice, there will typically be many more node agents (e.g., dozens, hundreds, or even more).

FIG. 4 also shows an event integration tool 430 in communication with the CCC tool 410. The event integration tool 430 and the CCC tool 410 can be implemented as separate software tools (as shown) or can be integrated into a single software package. Furthermore, the event integration tool 430 and the CCC tool 410 can be executed on different servers or consoles or on the same server or console. In the illustrated embodiment, the event integration tool 430 is implemented by a daemon 440 (e.g., a software program running as a background process) that accesses information from an input directory, folder, or memory 442 and stores information in an output directory, folder, or memory 444. Furthermore, in the illustrated embodiment, the daemon 440 uses a results database 446 to implement the compliance alerting process. The results database 446 can be used to store historical compliance data (e.g., compliance data for the IT network from an earlier time period). In certain implementations, the daemon 440 is a multi-threaded daemon.

FIG. 4 additionally shows a SIEM or logging tool 450 that is in communication with the event integration tool 430. In operation, and as more fully explained below, the event integration tool 430 is configured to input information from the CCC tool 410, process the data to determine one or more messages concerning compliance policy changes (e.g., compliance policy alerts), and output the results to the SIEM or logging tool 450.

Figure 6:
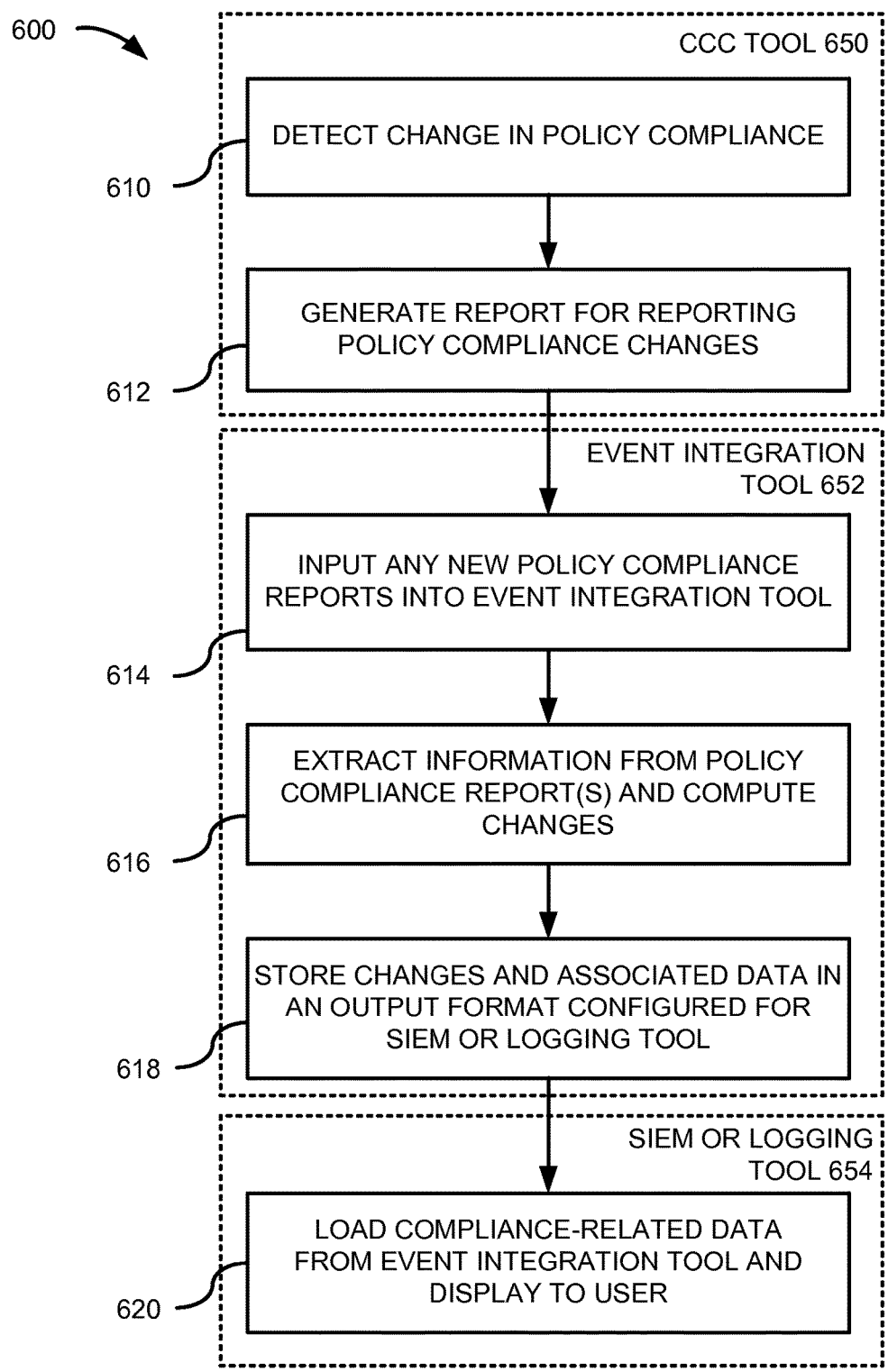
FIG. 6 is a flow chart of an exemplary method for performing compliance alerting using an embodiment of the event integration tool.

FIG. 6 is a flow chart of an exemplary method 600 for performing compliance alerting using an embodiment of the event integration tool (e.g., an embodiment arranged in accordance with FIG. 4). The method acts shown in FIG. 6 should not be construed as limiting, as any one or more of the method acts may be omitted, performed in a different order, or supplemented with one or more additional method acts. Furthermore, the dashed boxes in FIG. 6 identify which software component is performing the identified actions according to the illustrated embodiment. As can be seen, some of the actions are performed by a CCC tool 650, while others are performed by an event integration tool 652 or a SIEM or logging tool 654. It should be understood that in different embodiments, performance of any one of the illustrated actions can be omitted or be performed by a different one of the software components or consolidated with a single software component.

At 610, a change in policy compliance is detected and registered in the CCC tool 650 (e.g., in Tripwire Enterprise). For example, the change can be detected by a software agent running at a node in an IT management infrastructure.

At 612, the CCC tool 650 generates a report for reporting policy compliance changes. This report can be run as part of a task on the CCC tool that periodically generates the report (e.g., daily, hourly, weekly, or at any other desired time period or upon any other desired event). The report can also be generated at the request of an IT administrator. The report can be in any suitable format, but in one implementation is an XML file. In particular implementations, the report is saved in an input directory, folder, or memory associated with the event integration tool (e.g., the input directory, folder, or memory 442). In certain exemplary implementations, the policy compliance report can be a test results summary or a scoring report, such as a test results summary or scoring report generated by Tripwire Enterprise or other similar or equivalent report.

At 614, the event integration tool 652 checks for any new inputs in the input directory, folder, or memory and, when a new policy compliance report is found, inputs the policy compliance report into the event integration tool (e.g., the event integration tool buffers the report into local memory, loads the report, or otherwise accesses the report for further processing).

At 616, the event integration tool 652 processes the policy compliance report by extracting data from the report and computing changes in the test results or scores. For instance, in particular implementations, the event integration tool applies a customized parser to the report to extract relevant compliance information and compares the selected data to previous (historical) compliance results in order to compute one or more change values. As a result of this processing, change values and associated compliance data can be generated.

At 618, the change values and associated compliance data are stored in an output directory, folder, or memory in a message format that is configured for use by the SIEM or logging tool 654. For example, and as more fully explained below, the event integration tool 652 can generate one or more output messages for reporting compliance-related data to the SIEM or logging tool 654. The output messages can comprise, for example, single line events that follow a customizable syntax readable by the SIEM tool and displayed to an IT administrator. Examples of such formats include, for instance, a SYSLOG format or a format adapted for a particular SIEM tool (e.g., Arcsight).

At 620, a SIEM or logging tool (e.g., the SIEM or logging tool 654) accesses the output directory, folder, or memory and loads the information generated by the event integration tool. The SIEM or logging tool 450 can then display the results to a user (e.g., an IT administrator).

Figure 7:
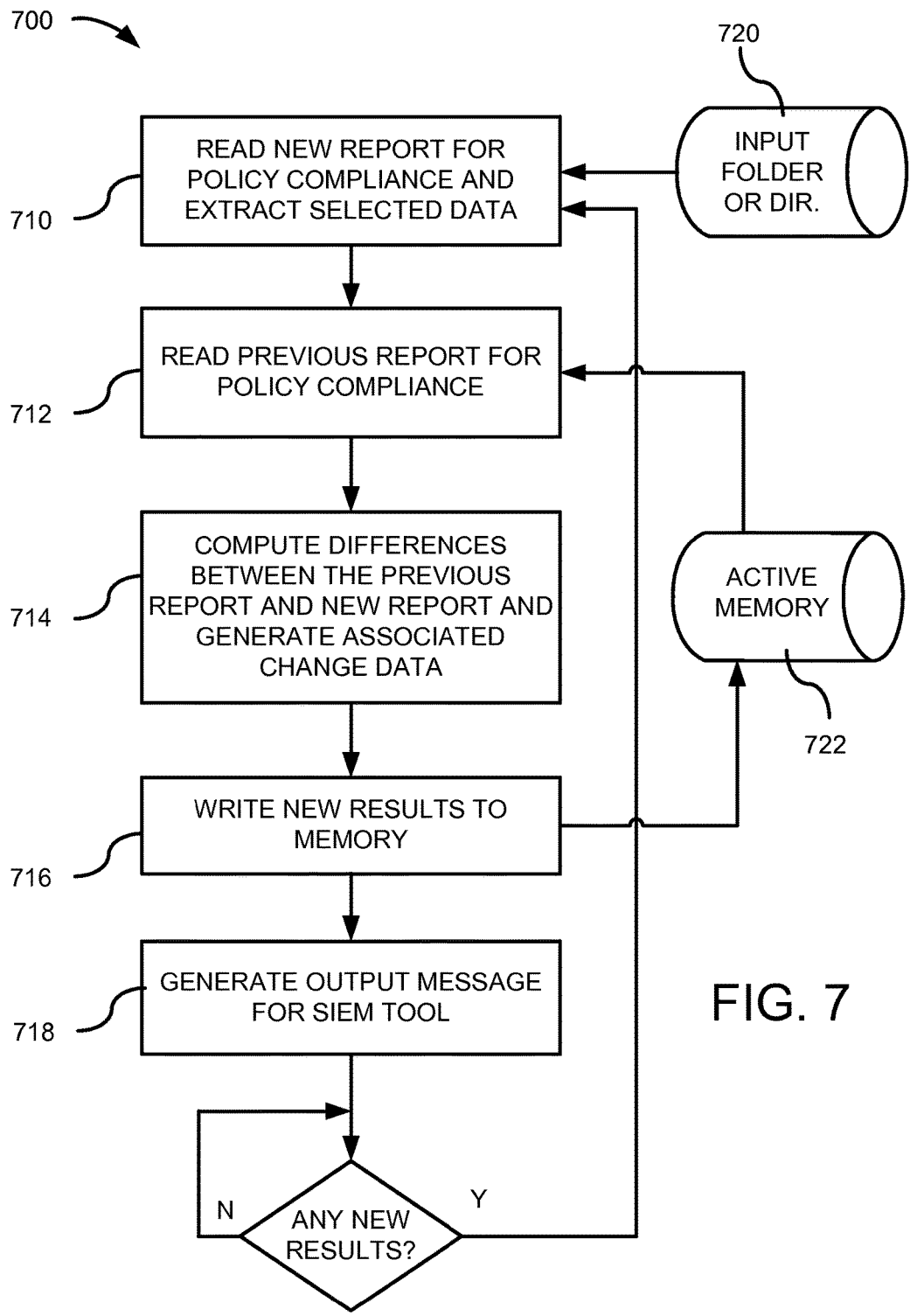
FIG. 7 is a flow chart showing an example process that can be performed by an event integration tool to perform aspects of a compliance alerting process.

FIG. 7 is a flow chart showing an example process 700 that can be performed by an event integration tool to perform aspects of a compliance alerting process (e.g., as may occur at 614, 616, and 618 of FIG. 6). The method acts shown in FIG. 7 should not be construed as limiting, as any one or more of the method acts may be omitted, performed in a different order, or supplemented with one or more additional method acts.

At 710, a new report for policy compliance is read and selected data extracted. For example, the new report for policy compliance can be accessed from an input folder, directory, or memory 720 and loaded into a temporary local memory store. Then, a parsing engine can parse the report to extract selected compliance results. The extracted compliance data can then be stored in a temporary data store that is used as a source for the extracted compliance data. The extracted compliance data can include a variety of information concerning changes observed at one or more nodes and related to a compliance policy. The extracted compliance data can include, for example, an identification of one or more compliance policies associated with the report, an identification of one or more nodes at which a change is detected, and details concerning the changes observed at the nodes.

At 712, historical (or previous) compliance data can be read. The historical compliance data can be loaded from a data store storing previous policy compliance results. In certain implementations, for example, the historical compliance data is stored in and accessed from a volatile active memory 722 that allows for fast reads and writes of data.

Figure 8:
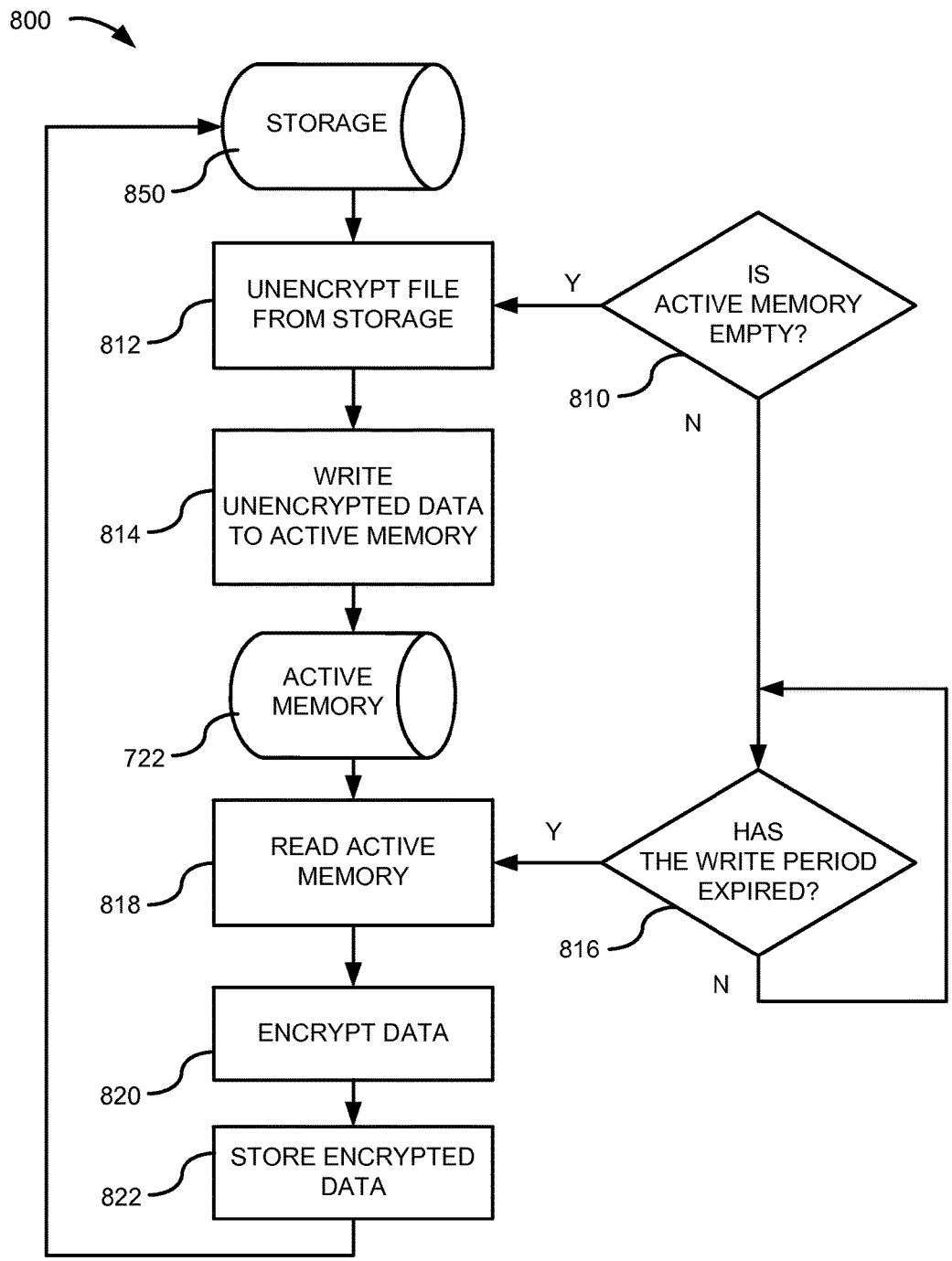
FIG. 8 is a flow chart of an exemplary method for managing and backing-up a memory used to store compliance results.

This can help the event integration tool perform well in all sizes of environment. The active memory for the historical compliance data can be periodically backed up to long-term file storage (e.g., long-term flat file storage). An exemplary method for maintaining the active memory and periodically saving the compliance data in a secure manner is illustrated in FIG. 8.

At 714, differences between the historical compliance data and the extracted compliance data are computed. Additional compliance change data can also be computed at 714. For example, data indicating a change to a score at one or more nodes, data indicating a number of changes associated with any of multiple severity levels, and/or data indicating a change to the number of nodes that passed a particular compliance test can be computed at 714. This additional compliance change data can be used to identify and report trends in compliance among the nodes in the IT infrastructure.

At 716, the new compliance data can be written to memory. For example, the newly extracted compliance data can be written to the volatile active memory 722. In particular implementations, the new data replaces previously stored data in the active memory 722 (e.g., all previously stored results are replaced or only those results that changed are replaced). In other embodiments, the active memory 722 maintains a store of historical compliance data (e.g., a fixed number of previous results) but uses the most recently stored results for the comparison performed at 714.

At 718, an output message is generated for communicating with a SIEM or logging tool. The output message can comprise, for example, at least a portion of the extracted compliance data as well as one or more of the additional compliance change data computed at 714.

At 720, a determination is made as to whether there are any new reports to be processed. If so, then the process is repeated at 710. If not, then the determination at 718 can be repeated periodically (e.g., at every hour, day, week, or any other desired time interval or event).

Although the process of FIG. 7 is shown as being particularly adapted to the evaluation of changes relative to a compliance policy, the process can be configured as a general method that periodically checks the input folder, directory, or memory for any type of report or event data to be generated by a CCC tool and processed by the event integration tool. For example, file or folder change data can also appear in the input directory, folder, or memory and be processed as part of the method 700. In particular, in certain implementations, any new report data appearing in the input directory, folder, or memory can be initially evaluated to determine whether it is related to a compliance policy change or a file or folder change unrelated to a compliance policy. The file or folder change can also be analyzed as part of the method 700 and also sent to the SIEM or logging tool for display to the IT administrator. An exemplary method for evaluating change data is discussed below with respect to FIG. 9 and can be integrated into the flow of FIG. 6 or 7.

FIG. 8 is a flow chart of an exemplary method 800 for managing and backing-up a memory used to store compliance results (e.g., the active memory 722). The method shown in FIG. 8 can be used in conjunction with the method shown in FIG. 7. The method acts shown in FIG. 8 should not be construed as limiting, as any one or more of the method acts may be omitted, performed in a different order, or supplemented with one or more additional method acts.

At 810, a determination is made as to whether the active memory is empty or not. If the active memory is empty, then, at 814, the most recent data stored in non-volatile storage 850 is accessed at 812 and written to the active memory 722. In the illustrated embodiment, encryption is used to store the data in the non-volatile storage 850; thus, at 814, the stored data is unencrypted.

At 816, if the active memory 722 is not empty, a determination is made as to whether a periodic write period has expired. If not, then the process returns to 816 until the periodic write period has expired. The periodic write period can be set to any desirable time interval for backing up the data in the active memory 722 (e.g., hourly, daily, weekly, or after any other desired time period or upon any desired event). In certain implementations, the length of the periodic write period can be set by a user in a configuration file.

At 818, if the periodic write period has expired, the data in the active memory 722 is read, encrypted at 820, and written to non-volatile storage at 822. In particular implementations, the data in the active memory 722 is stored as a flat file in non-volatile storage 850. Further, any suitable encryption scheme can be used (e.g., a 3DES scheme). The data in the active memory can comprise, for example, historical policy compliance data or change data as described above and elsewhere herein. Further, in certain implementations, the active memory 722 is re-initialised on each start up of the event integration tool.

B. Exemplary Filter Integrity Alerting Frameworks

The purpose of the exemplary event integration framework 500 shown in FIG. 5 is to provide to the SIEM or logging tool events that indicate a change has occurred that impacts a file or folder. The CCC tool typically generates the event that will be passed to the SIEM or logging tool. The event can include, for example, data indicating the change that has been detected, the node that is affected, and/or the time and date of detection.

As with FIG. 4, the event integration framework 500 in FIG. 5 comprises a CCC tool 510, which typically comprises a software tool (e.g., Tripwire Enterprise) running on a server or console of an IT administrator for a network of IT nodes. The CCC tool 510 communicates with a CCC database 512 that is used store a variety of information for supporting the CCC tool (e.g., compliance policies, baseline information, and/or a data structure for storing information about currently monitored and managed nodes). The CCC console 510 is also in communication with one or more node agents, which typically comprise software agents running at the individual nodes in the monitored IT network and configured to detect change data and send appropriate change messages to the CCC tool. A representative node agent 520 is shown in FIG. 5, though it should be understood that in practice there will typically be many more node agents (e.g., dozens, hundreds, or even more).

FIG. 5 also shows an event integration tool 530 in communication with the CCC tool 510. The event integration tool 530 and the CCC tool 510 can be implemented as separate software tools (as shown) or can be integrated into a single software package. Furthermore, the event integration tool 530 and the CCC tool 510 can be executed on different servers or consoles or on the same server or console. In the illustrated embodiment, the event integration tool 530 is implemented by a daemon 540 (e.g., a software program running as a background process) that accesses information from an input directory, folder, or memory 542 and stores information in an output directory, folder, or memory 544. The daemon 540 can be a multi-threaded daemon.

FIG. 5 also shows a SIEM or logging tool 550 that is in communication with the event integration tool 530. In operation, and as more fully explained below, the event integration tool 530 is configured to input information from the CCC tool 510, process the data to produce file integrity alerts, and output the results to the SIEM or logging tool 550.

Figure 9:
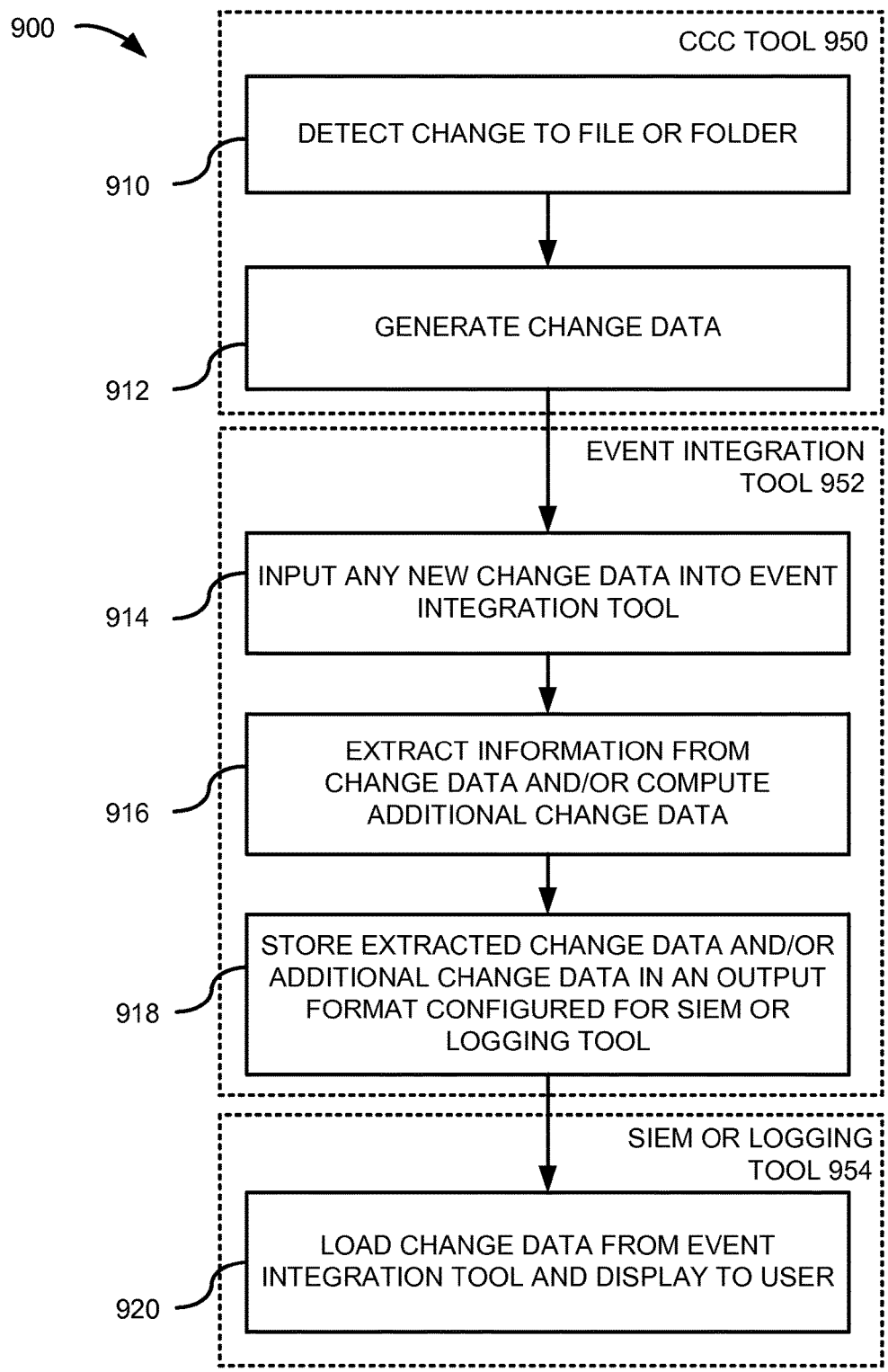
FIG. 9 is a flow chart of an exemplary method for analyzing and alerting a SIEM tool to changes that impact a file or folder at a node using an event integration tool.

FIG. 9 is a flow chart of an exemplary method 900 for analyzing and alerting an SIEM to changes that impact a file or folder at a node using an event integration tool. The method acts shown in FIG. 9 should not be construed as limiting, as any one or more of the method acts may be omitted, performed in a different order, or supplemented with one or more additional method acts. Furthermore, the dashed boxes in FIG. 9 identify which software component is performing the identified actions according to the illustrated embodiment. As can be seen, some of the actions are performed by a CCC tool 950, while others are performed by an event integration tool 952 or a SIEM or logging tool 954. It should be understood that in different embodiments, performance of any one of the illustrated actions can be omitted or performed by a different one of the software components or consolidated with a single software component.

At 910, a change to a file or folder is detected (e.g., by a software agent running at an IT node) and registered in the CCC tool 950 (e.g., in Tripwire Enterprise). For example, the details of the change can be sent by the software agent operating at the node to the CCC tool. The changes can be stored in a database at the CCC tool.

At 912, the CCC tool 950 generates change data that can be sent to an event integration tool. For example, a report can be generated that includes the change data or the change data can be sent as a separate item (e.g., a SYSLOG event). In particular implementations, the change data is sent dynamically as it is generated, or the data can be sent periodically (e.g., daily, hourly, weekly, or at any other desired time period or upon any desired event). A report that includes the change data can also be generated at the request of an IT administrator. Further, in particular implementations, the report is saved in an input directory, folder, or memory associated with the event integration tool 952 (e.g., the input directory, folder, or memory 442).

At 914, the event integration tool 952 checks for any new inputs in the input directory, folder, or memory and, when new change data is found, inputs the change data into the event integration tool (e.g., the event integration tool buffers the change into memory, loads the change data, or otherwise accesses the change data for further processing).

At 916, the event integration tool 952 processes the change data. For instance, in particular implementations, the event integration tool 952 extracts relevant information by applying a customized parser to the change data. The event integration tool can also create additional change data from the extracted information. For example, the additional change event data can comprise data related to each change detected (e.g., created using a ChangeWithAudit parser, as explained below) or can be a single new event that represents multiple change events (e.g., created using a Aggregator Parser, as explained below). In particular implementations, the type of parser that is used to generate the additional change data is determined by a configuration file for the event integration tool. Furthermore, the parser that is applied can be dependent on one or more other characteristics of the change data. For instance, in particular implementations, the change data is associated with a severity level (e.g., as determined by the CCC tool) that can be used to determine which parser is used and how and/or whether the data is sent to the SIEM or logging tool.

At 918, the extracted change data and/or the additional change data is stored in an output directory, folder, or memory.

At 920, a SIEM or logging tool (e.g., the SIEM or logging tool 450) accesses the output directory, folder, or memory and loads the information generated by the event integration tool 952. The SIEM or logging tool 450 can then display the results to a user (e.g., an IT administrator).

C. Exemplary Flexible Output Types

In certain embodiments, the event integration tool has the ability to output data in a number of different formats. For example, in certain implementations, the event integration tool is configured to output data in a customizable format and/or one or more predetermined formats (e.g., a format that is adapted for use with a commercially available SIEM or logging tool, or a standard format that is used when the format for the SIEM or logging tool is not specifically defined).

1. Example Output Formats

In this section, four example formats are described that can be used for outputting data from the event integration tool. In the following sections, an exemplary customizable syntax is presented. The example formats below were generated using the customizable syntax and illustrate the flexibility of the disclosed approach. For example purposes only, the formats below are described in connection with the Tripwire Enterprise CCC tool and refer to data types that are generated by Tripwire Enterprise. It is to be understood that the technology can be adapted for use with any CCC tool and that similar data and data types are or can be generated with other CCC tools.

a. Event Output—Outputting "Who" Data

In particular implementations, an event generated by the event integration tool and used to identify an individual event (e.g., as output from the framework illustrated in FIG. 5) is output in the following format:

%<CCCTOOLNAME>||<TYPENO>||<TYPENAME>||<SEVERITY>||<NODENAME>||<SERVERTYPE>||<RULENAME>||<ELEMNAME>||<CHANGETYPE>||<VERSION>||<USERNAME> where, CCCTOOLNAME is the name of the CCC tool that captured the change; TYPENO is the ID number of the type of CCC tool event; TYPENAME is the name of the type of CCC tool event; SEVERITY is the criticality of the event (as determined by the CCC tool); NODENAME is the server name that has changed; SERVERTYPE is the type of node that has changed (e.g., IPSO, Windows 2003, or any other type of node); RULENAME is the name of the rule in the CCC tool that identified the change; ELEMNAME is the name of the element in the CCC tool that has changed (e.g., the file name); CHANGETYPE is a categorization of the change (e.g., added, removed, or modified); VERSION is the date and time at which the change was detected; and/or USERNAME is the individual who made the change.

An example event using this format is as follows:

%Tripwire||1||File Integrity Change||High||testserver1||Windows Server||Integration Demo||O:\Tripwire\integration demo\high\one.txt||Modified||3-3-11 18:12||Test\John Smith b. Event Output—Counting the Number of Events of an Individual Severity In particular implementations, an event generated by the event integration tool and used to indicate the number of events observed by a CCC tool having a particular severity level (e.g., as output from the framework illustrated in FIG. 5) is output in the following format:

```
%<CCCTOOLNAME>||<TYPENO>||<TYPENAME>||
<NODENAME>||<SEVERITY>||<CHANGECOUNT>||<VERSION>
``` where, CCCTOOLNAME is the name of the CCC tool that captured the change; TYPENO is the ID number of the type of CCC tool event; TYPENAME is the name of the type of CCC tool event; NODENAME is the server name that has changed; SEVERITY is the criticality of the event (as determined by the CCC tool); CHANGECOUNT is the number of changes detected at that given severity level; and/or VERSION is the date and time at which the change was detected.

An example event using this format is as follows:

%Tripwire||2||File Change Count||testserver1||Medium||2|| 31-1-11 15:10 c. Event Output—Change in Score

In particular implementations, an event generated by the event integration tool and used to indicate a change in a compliance policy score (e.g., as output from the framework illustrated in FIG. 4) is output in the following format:

```
%<CCCTOOLNAME>||<TYPENO>||<TYPENAME>||
<NODENAME>||<POLICYNAME>||<SCORECHANGE>
``` where, CCCTOOLNAME is the name of the CCC tool that captured the change; TYPENO is the ID number of the type of CCC tool event; TYPENAME is the name of the type of CCC tool event; NODENAME is the server name that has changed; POLICYNAME is the name of the policy that has change; and/or SCORECHANGE is the change to the current device score.

An example event using this format is as follows:

%Tripwire||3||Summary Compliance Change||testserver1||Windows 2008 DM PCI Policy v2.1||+ 1.10 d. Event Output—Change in Test Results

In particular implementations, an event generated by the event integration tool and used to indicate a change in test results related to a compliance policy (e.g., as output from the framework illustrated in FIG. 4) is output in the following format:

```
%<CCCTOOLNAME>||<TYPENO>||<TYPENAME>||
<NODENAME>||<POLICYNAME>||<NOPASSES>||<NOFAILS>||
<PERCENTAGE>||<CHANGETOPASSES>||<CHANGETOFAILS>
``` where, CCCTOOLNAME is the name of the CCC tool that captured the change; TYPENO is the ID number of the type of the CCC tool event; TYPENAME is the name of the type of the CCC tool event; NODENAME is the server name that has changed; POLICYNAME is the name of the policy that has changed; NOPASSES is the current number of passed tests for the device; NOFAILS is the current number of failed tests for the device; PERCENTAGE is the percentage pass rate for the device; CHANGETOPASSES is the difference between the old and new node passed tests; CHANGETOFAILS is the difference between the old and new node failed tests.

An example event using this format is as follows:

%Tripwire||4||Test Result Compliance Change||testserver1||Windows Policy v1.1||124||100||45||+ 5||-5

2. Exemplary Flexible Output Embodiments

In particular embodiments, the output from the event integration tool can be adapted for a particular SIEM or logging tool. For instance, the output type can be flexibly altered by a user or an entity that supports the event integration tool (e.g., a support engineer). This provides additional flexibility for connection to SIEMs or logging tools.

In certain embodiments, the flexible output from the event integration tool can be divided into component parts. In one particular implementation, the component parts are the parts identified in Table 1, though more or fewer of these components can be used in embodiments of the disclosed technology, alone or in combination with other components.

TABLE 1

Flexible Output Components

| Component | Description |
|---|---|
| Variable Fields | These are specific pieces of data that are outputted by the event integration tool. This is a dynamic field. |
| Static Fields | These are fixed pieces of data/information. Each of these fields can be customized to include static user driven content. |
| Delimiters | The delimiter is used to separate fields into individual chunks. This is useful in providing separation between data fields for normalization purposes. |

The list of available variables depends on the parsers that are in use by the event integration tool. The tables below illustrate available variables for four non-limiting example parsers: (1) a parser for indicating a change at a node that is detected by a rule running at a node and for identifying the user who made the change (labeled here as the "CustomChangeWithAudit" parser); (2) a parser for providing summary change data that indicates how many changes of a particular severity level (as determined by the CCC tool) have been detected (labeled here as the "CustomAggregrator" parser); (3) a parser for determining the name and numerical identification of a change event that affects a compliance policy and further determines a change in the compliance score for a particular node or group of nodes (labeled here as the "CustomCompliance (Scoring Reports)" parser); and (4) a parser for identifying changes to compliance test results, among other things (labeled here as the "CustomCompliance (Test Result Summary Reports)" parser)

Furthermore, some of the information that is parsed by the parser is sent by the CCC tool whereas other data is computed by the parser itself.

TABLE 2

CustomChangeWithAudit Variables
Parser: CustomChangeWithAudit

| Variable Syntax | Description |
|---|---|
| <TYPENO> | The ID number of the type of CCC tool event. |
| <TYPENAME> | The name of the type of CCC tool event. |
| <SEVERITY> | The criticality of the event as determined by the CCC tool. |

TABLE 2-continued

CustomChangeWithAudit Variables
Parser: CustomChangeWithAudit

| Variable Syntax | Description |
|---|---|
| <NODENAME> | The name of the device that has changed. |
| <SERVERTYPE> | The type of node that has changed (e.g., Windows, Redhat, etc.). |
| <RULENAME> | The name of the rule that has identified the change. |
| <ELEMNAME> | The name of the element in the CCC tool that has changed (e.g., the file name). |
| <CHANGETYPE> | The categorization of the change (e.g., added, removed, or modified). |
| <VERSION> | The date and time at which the change was detected. |
| <USERNAME> | The username that made the change. |

With respect to the "CustomChangeWithAudit" parser, several of the values for the variables are derivable directly from the data from the CCC tool, whereas other values are computed by the parser itself. For example, in one particular implementation, all values are provided by the CCC tool (e.g., Tripwire Enterprise).

TABLE 3

CustomAggregator Variables
Parser: CustomAggregator

| Component | Description |
|---|---|
| <TYPENO> | The ID number of the type of Tripwire event. |
| <TYPENAME> | The name of the type of Tripwire event. |
| <NODENAME> | The name of the device that has changed. |
| <SEVERITY> | The criticality of the event as determined by TE. |
| <CHANGECOUNT> | The number of changes detected at the defined <SEVERITY>. |
| <VERSION> | The date and time at which the change was detected. |

With respect to the "CustomAggregator" parser, several of the values for the variables are derivable directly from the data from the CCC tool, whereas other values are computed by the parser itself. For example, in one particular implementation, all values except for TYPENO, TYPENAME, and CHNAGECOUNT are provided by the CCC tool (e.g., Tripwire Enterprise). The remaining values can be computed by the parser itself and included in the output format.

TABLE 4

Scoring Variables
Parser: CustomCompliance (Scoring Reports)

| Component | Description |
|---|---|
| <TYPENO> | The ID number of the type of Tripwire event. |
| <TYPENAME> | The name of the type of Tripwire event. |
| <NODENAME> | The name of the device that has changed. |
| <POLICYNAME> | The name of the policy that has changed. |
| <SCORECHANGE> | The change to the score. |

With respect to the "CustomCompliance (Scoring Reports)" parser, several of the values for the variables are derivable directly from the data from the CCC tool, whereas other values are computed by the parser itself. For example, in one particular implementation, all values except for TYPENO, TYPENAME, and SCORECHANGE are provided by the CCC tool (e.g., Tripwire Enterprise). The remaining values can be computed by the parser itself and included in the output format.

TABLE 5

Test Results Variables
Parser: CustomCompliance (Test Result Summary Reports)

| Component | Description |
|---|---|
| <TYPENO> | The ID number of the type of Tripwire event. |
| <TYPENAME> | The name of the type of Tripwire event. |
| <NODENAME> | The name of the device that has changed. |
| <POLICYNAME> | The name of the policy that has changed. |
| <NOPASSES> | The current number of passed tests for the device. |
| <NOFAILS> | The current number of failed tests for the device. |
| <PERCENTAGE> | The current perecentage pass rate for the device. |
| <CHANGETOPASSES> | The change to the total number of passed tests. |
| <CHANGETOFAILS> | The change to the total number of failed tests. |

With respect to the "Test Results" parser, several of the values for the variables are derivable directly from the data from the CCC tool, whereas other values are computed by the parser itself. For example, in one particular implementation, all values except for TYPENO, TYPENAME, CHANGETOPASSES, and CHANGETOFAILS are provided by the CCC tool (e.g., Tripwire Enterprise). The remaining values can be computed by the parser itself and included in the output format.

3. Defining the Output Format in a Configuration File

In certain embodiments, the available field types described in Table 1 can be combined using the following syntax:

<VARIABLE> or <STATIC STRING>*<VARIABLE>or<STATIC STRING>*...

Further, the syntax used to define an output format can be defined and stored in a configuration file and can follow a particular set of syntax rules. For example, in accordance with one particular implementation, the syntax follows the following rules (which can be implemented in any combination or subcombination with one another) when generating a custom output string: (1) a "*" is used as the delimiter field; (2) sequential <VARIABLE> or <STATIC STRING> fields are separated by a "*" (the star inserts the delimiter field); (3) delimiters cannot exist at the start or the end of an output string; and/or (4) the "*" character is reserved by the event integration tool and, as a result, it cannot be used inside a <STATIC STRING>.

As an example of this particular example implementation, to generate an output string of:

"Tripwire|server1.testdomain.com|5|Low"

where: (1) "Tripwire" is a <STATIC STRING>; (2) "|" is a delimiter; (3) "server1.testdomain.com" is the <NODENAME> variable; (4) "5" is the <CHANGECOUNT> variable; and (5) "low" is the <SEVERITY> variable, the following variable fields, static string fields, and delimited fields can be stored in a configuration file:

Tripwire*<NODENAME>*<CHANGECOUNT>*<SEVERITY>.

As noted, the flexible output type can be established and generated within a configuration file. In particular implementations, the configuration file includes one or more output types for each parser type. Additionally, although only a few example parsers are described herein, embodiments of the disclosed technology can have any number of parsers, which can be customized for a particular report or type of information desired to be detected by the event integration tool and reported to the SIEM or logging event tool.

D. Implementation Details of an Example Event Integration Tool

In certain implementations, the event integration tool is comprised of a set of Jar files. The Jar file itself can be restricted to write and execute level permissions for the same user of the CCC tool. In certain implementations, the event integration tool is implemented as a multi-threaded daemon. Further, in some implementations, performance aspects of the daemon can be adjusted to achieve a desired behavior of the daemon. For instance, the daemon can be adjusted by changing certain settings in a configuration file. Table 6 identifies the settings that can be adjusted in a particular example implementation of the disclosed technology. Table 6 also shows a default for each setting, though it is to be understood that these values are for example purposes only and can be adjusted as desired by a user. Furthermore, other embodiments can have any combination or subcombination of these settings, either alone or together with one or more additional settings.

TABLE 6

Performance Settings

| Setting | Description | Default |
| --- | --- | --- |
| ThreadCount | The number of threads that can process data at any one time. | 2 |
| ThreadCountPoll | The amount of time between each Thread execution. Measured in milliseconds. | 1500 |
| FileSearchPoll | Sets how often the Daemon searches for new input to process. Measured in milliseconds. | 30000 |
| SaveActiveMemPeriod | Sets how often the current data stored in memory is written to disk. Measured in milliseconds. | 60000 |

Certain embodiments of the disclosed technology also include the capability for controlling a log that is used to store the current activity of the event integration tool and some historical information as well. The log can also be used to store any issues that occur during operation of the event integration tool. The log can grow in size quite quickly; accordingly, a log rotation feature can be enabled to help control the log. In particular implementations, the log rotation can be controlled by adjusting one or more settings associated with the log. Table 7 identifies the settings that can be adjusted in a particular example implementation of the disclosed technology.

TABLE 7

Log Rotation Settings

| Setting | Description | Default |
| --- | --- | --- |
| wrapper.logfile.maxsize | The maximum size that a log file can grow before rotation. | 0 (no rotation) |
| wrapper.logfile.maxfiles | The number of times that a log file can be rotated. | 0 |

E. Event Parsers and Severity Levels

Embodiments of the disclosed event integration tool are implemented using one or more parsers. These parsers allow the event integration tool to interpret the CCC output in different ways. Furthermore, in certain embodiments, two or more parsers can be assigned to different severity levels so that a respective parser will only be applied to data from the CCC tool having a particular severity level. This approach provides the user with the facility to use different parsers that are dependent on the severity level of an event detected by the CCC tool. For example, in particular implementations, the CCC tool assigns a detected change to a severity level or a compliance policy change to a particular severity level. Depending on the severity level, a different parser can be used to process the information from the CCC tool in the event integration tool. In certain embodiments, a parser can be assigned to one or more severity levels that are associated with a detected event. The parser assignment information can be stored, for example, in a configuration file.

Furthermore, in certain embodiments, for parsers that concern information related to compliance with one or more compliance policies, a parser can be applied to compliance-related data (e.g., all compliance-related data) but can generate and send data to the SIEM or logging tool only if the information from the CCC tool indicates a particular compliance behavior or trend at a monitored node or group of nodes. In other words, the behavior or trending of a node computed by a parser can be used as a criterion for whether a particular type of output is created by a parser for output to the SIEM or logging tool.

Tables 8 and 9 below illustrate an exemplary implementation where parsers for change data and parsers for compliance data are used. In the exemplary implementation, the following syntax can be used to assign a parser for change data to a particular severity level:

Process=<Severity>:<Parser>.

where:

TABLE 8

Parser Assignment Data for Change-Related Parsers

| Name | Description |
| --- | --- |
| <Severity> | This correlates to a severity level that has been assigned by the CCC tool. Typically, the severity levels comprise "high", "medium", or "low" |
| <Parser> | This defines which parser to use for the associated severity level. |

Further, in certain implementation, the format for parsers for compliance data is as follows:

Process=<Behavior>:<Parser> where:

TABLE 9

Parser Assignment Data for Compliance-Related Parsers

| Name | Description |
| --- | --- |
| <Behavior> | This can be set to "Up", "Down", or "Both". This setting determines when the event integration tool will send data to the SIEM or logging tool. In "Both" mode, all compliance data is sent regardless of whether a policy increases or decreases in compliance. In "Up" mode, compliance data is only sent when a policy goes up in compliance. In "Down" mode, compliance data is only sent when a policy goes down in compliance. |

TABLE 9-continued

Parser Assignment Data for Compliance-Related Parsers

| Name | Description |
|---|---|
| <Parser> | This defines which parser is used to compute behavior and conditionally generate the output data for the SIEM tool. |

F. Example Parsers

A wide variety of parsers can be implemented in embodiments of the disclosed event integration tool. For example, parsers can be written to extract and use any available type of data generated by a CCC tool. Furthermore, parsers of the disclosed event integration tool can extract information from data that is sent by the CCC tool on an event-by-event basis (e.g., change data that is sent substantially contemporaneous to the actual detection of the event) or from a report, table, or log that is generated periodically by the CCC tool.

Table 10 below lists four example parsers as can be used in embodiments of the disclosed technology. The parsers shown in Table 10 should not be construed as limiting, as they are only examples in a broad class of possible parsers. Table 10 is split into three columns. The "Name" column describes the parser name (e.g., the name that can be used in the configuration file to identify the parser). The "Event ID" column details the ID that can appear in the output message and that identifies the parser. The "Description" column provides a brief a description of each parser.

TABLE 10

Example Parser Types

| Name | Event ID | Description |
|---|---|---|
| CustomChangeWithAudit | 1 | This parser provides detailed change audit information complete with audit ("who") data for each identified change. This is a granular parser that extracts events on a per change basis (e.g., a node that has 50 changes will be represented by 50 events in the integration). |
| CustomAggregator | 2 | This parser provides summary change audit information based on how many changes of a certain severity have been detected. This is a less granular parser that highlights groups of changes as a single event (e.g., a node that has 50 changes at low severity will be represented by a single event generated by the event integration tool. In particular, in this example, the parser will aggregate the total number of low severity changes and report 50 changes have occurred on node X at low severity) |
| CustomCompliance | 3 & 4 | This parser sends compliance data to the SIEM or logging tool. In one implementation, there are at least two functions that that this parser manages: 1. Scoring Data; and 2. Test Results Data. Both forms of data indicate a change in compliance to any given policy that the CCC tool monitors (e.g., a change to a compliance score, or a change to test results produced by the CCC tool). |

G. Embodiments for Processing Customized Output Formats

Figure 10:
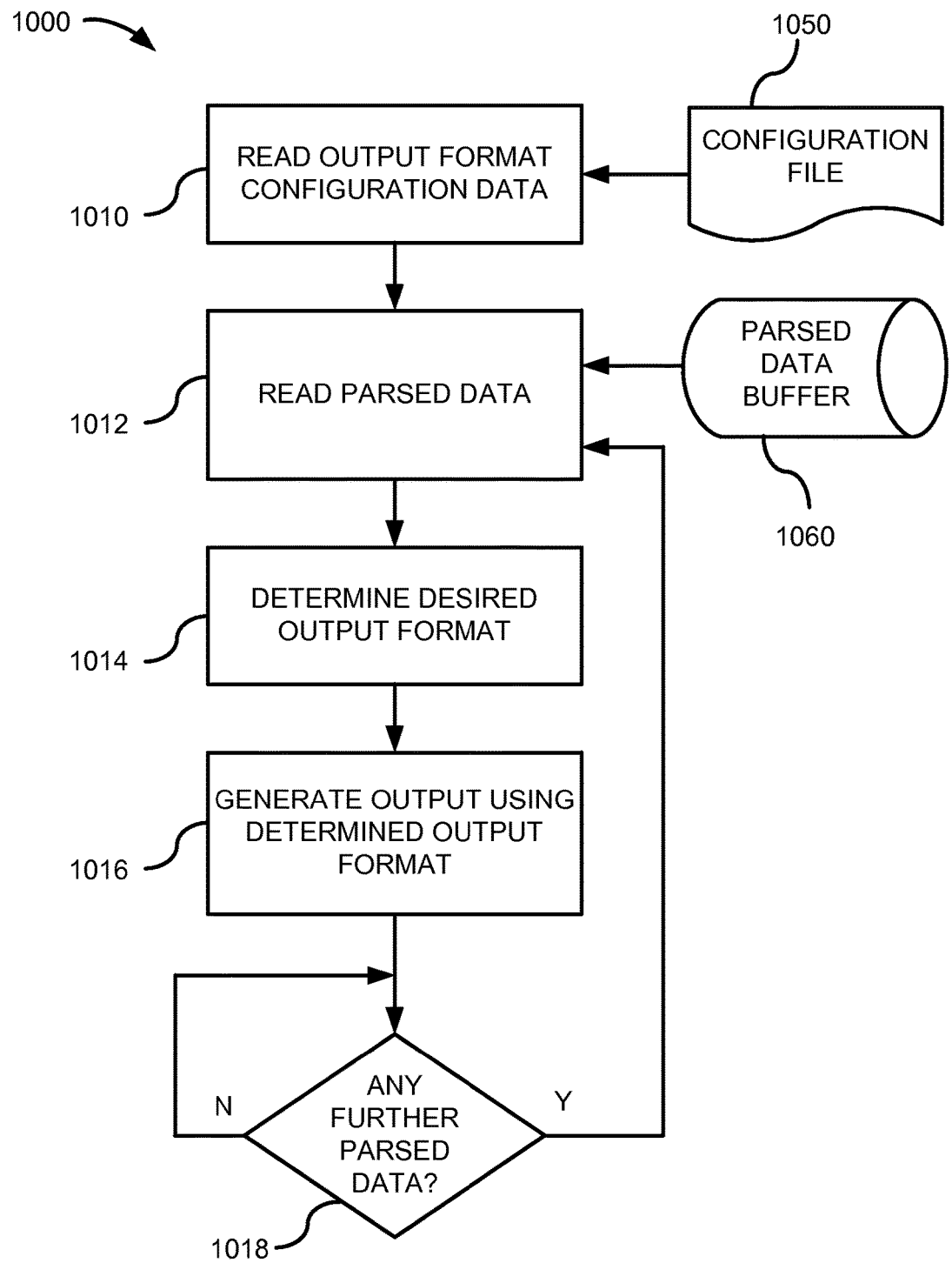
FIG. 10 is a flow chart of an exemplary method for illustrating how a parser can create a message in a particular output format using a flexible output mechanism

FIG. 10 is a flow chart of an exemplary method 1000 for how a parser can create a message in a particular output format using a flexible output mechanism, such as the exemplary mechanism described above. The flexible output method 1000 can be performed, for example, by a software module of the event integration tool that receives information from a parser and assembles the data according to the desired format. In other words, in some embodiments, the parsers can be written to provide data in a generic or defined format; a flexible output module can then perform the method 1000 to arrange the data in a specified manner. In other implementations, the method 1000 is performed by the parser itself (e.g., as part of an output stage). The method acts shown in FIG. 10 should not be construed as limiting, as any one or more of the method acts may be omitted, performed in a different order, or supplemented with one or more additional method acts.

At 1010, output format configuration data is read (e.g., buffered, loaded, or otherwise accessed for further processing). The output format configuration data can be stored in a configuration file 1050 that can be used to define a number of different performance variables of the event integration tool. In general, the output format configuration data defines the format of output for a given parser. For example, a different output format may exist for each different available parser. Furthermore, in certain embodiments, multiple different output formats for a parser can exist or multiple parsers can use a common output format.

At 1012, parsed data is read. For example, data produced by any of the parsers discussed above can be read from a parsed data buffer 1060 used to store the parsed data after a parser processes the data. The parser can initially store the data in a generic or standard format where it can subsequently be manipulated. The data can include, for example, any of the data identified in tables 2-5 above or other such event or compliance change data. In particular implementations, data is read from the parsed data buffer 1060 in a first-in first-out ("FIFO") sequence.

At 1014, a determination is made as to which output format to use. This determination can be made for example by checking a variable or user setting that specifies which output format is to be used. In certain embodiments, for example, a user can select a particular format (e.g., a standard format or a format that is compliant with a particular SIEM or logging tool). The user can select the format by either storing the selection in the configuration file or making an appropriate selection in a graphic user interface, thus creating data for the selection.

At 1016, an output message using the output format determined at 1014 is generated and output. For example, a message using the output format selected at 1014 and read at 1010 can be generated and written to an output buffer (e.g., output folder, directory, or memory 444, or 544). The output buffer can then be accessed by a SIEM or logging tool or can transmit the messages to the SIEM or logging tool for use by the tool. At 1018, a determination can be made as to whether there is more data in the parsed data buffer 1060 to process. If so, the process can continue at 1012 for the next item of parsed; otherwise, the process can periodically repeat at any desired interval.

V. Concluding Remarks

The particular interfaces, features, and capabilities illustrated by FIGS. 1-10 should not be construed as limiting, as the technology can be implemented using a wide variety of different programs, interfaces, features and capabilities.

Having illustrated and described the principles of the disclosed technology, it will be apparent to those skilled in the art that the disclosed embodiments can be modified in arrangement and detail without departing from such principles. For example, any one or more aspects of one embodiment can be applied in other embodiments. In view of the many possible embodiments to which the principles of the disclosed technologies can be applied, it should be recognized that the illustrated embodiments are only preferred examples of the technologies and should not be taken as limiting the scope of the invention. Instead, the invention is defined by the following claims and their equivalents. I therefore claim all that comes within the scope and spirit of the following claims and their equivalents.

What is claimed is:

1. A computer-implemented method, comprising:
   by an event integration tool ("EIT") implemented by computing hardware and configured to integrate information from a compliance and configuration control ("CCC") tool with a security information and event management ("SIEM") or logging tool, thereby providing a flexible output mechanism that allows a user or support engineer to customize the output from the CCC tool:
      reading, by the EIT, output format configuration data defining a user-selected output format selected from multiple output formats;
      inputting, by the EIT, first compliance data parsed from a compliance report generated by the CCC tool, the first compliance data indicating compliance results for one or more nodes in an information technology ("IT") network relative to one or more compliance policies at a first time period;
      determining, by the EIT, a compliance trend for the one or more nodes in the IT network by comparing the first compliance data to second compliance data from a previous compliance report, the second compliance data from the previous compliance report indicating the compliance status of the one or more nodes in the IT network at a second earlier time period that is previous to and different from the first time period; and
      conditionally generating, by the EIT, an output message for the SIEM or logging tool according to the user-selected setting output format, the generating being performed only when (a) the compliance trend is less compliant in the compliance report for the first time period than indicated by the previous compliance report for the second earlier time period, and (b) the user-selected setting indicates a conditional reporting mode in which output messages are generated only if the compliance trend indicates that the one or more nodes are less compliant in the compliance report for the first time period than indicated by the previous compliance report for the second earlier time period.

2. The method of claim 1, wherein the generating further comprises generating the output message in a message format adapted for the SIEM or logging tool.

3. The method of claim 1, wherein the compliance results are provided by respective software agents that are running at the one or more nodes and that are configured to detect changes at the one or more nodes.

4. The method of claim 1, wherein the compliance results comprise data identifying a name of a node that has changed and data identifying a name of a policy that detected the changed node.

5. One or more non-transitory computer-readable media storing computer-executable instructions which when executed by a computer cause the computer to perform a method for integrating information from a compliance and configuration control ("CCC") tool with a security information and event management ("STEM") or logging tool using an event integration tool that provides a flexible output mechanism allowing a user or support engineer to customize the output from the CCC tool, the method comprising:
   reading output format configuration data defining a user-selected output format;
   inputting compliance data parsed from a compliance report generated by the CCC tool, the compliance data indicating compliance results for one or more nodes in an information technology ("IT") network relative to one or more compliance policies at a first time period;
   determining a compliance trend for one or more nodes in the IT network by comparing the compliance data to compliance data from a previous compliance report, the compliance data from the previous compliance report indicating the compliance status of the one or more nodes in the IT network at a second earlier time period that is previous to and different from the first time period; and
   conditionally generating an output message for the SIEM or logging tool according to the user-selected setting output format, the generating being performed only when (a) the compliance trend is less compliant in the compliance report for the first time period than indicated by the previous compliance report for the second earlier time period, and (b) the user-selected setting indicates a conditional reporting mode in which output messages are generated only if the compliance trend indicates that the one or more nodes are less compliant in the compliance report for the first time period than indicated by the previous compliance report for the second earlier time period.

6. The one or more non-transitory computer-readable media of claim 5, wherein the generating further comprises generating the output message in a message format adapted for the STEM or logging tool.

7. The one or more non-transitory computer-readable media of claim 5, wherein the compliance results are provided by respective software agents that are running at the one or more nodes and that are configured to detect changes at the one or more nodes.

8. The one or more non-transitory computer-readable media of claim 5, wherein the compliance results comprise data identifying a name of a node that has changed and data identifying a name of a policy that detected the changed node.

9. A system, comprising:
one or more processors; and
one or more non-transitory computer-readable media storing computer-executable instructions which when executed by the one or more processors cause the one or more processors to perform a method for integrating information from a compliance and configuration control ("CCC") tool with a security information and event management ("STEM") or logging tool using an event integration tool that provides a flexible output mechanism allowing a user or support engineer to customize the output from the CCC tool, comprising:
reading output format configuration data defining a user-selected output format;
inputting compliance data parsed from a compliance report generated by the CCC tool, the compliance data indicating compliance results for one or more nodes in an information technology ("IT") network relative to one or more compliance policies at a first time period;
determining a compliance trend for one or more nodes in the IT network by comparing the compliance data to compliance data from a previous compliance report, the compliance data from the previous compliance report indicating the compliance status of the one or more nodes in the IT network at a second earlier time period that is previous to and different from the first time period; and
conditionally generating an output message for the SIEM or logging tool according to the user-selected setting output format, the generating being performed only when (a) the compliance trend is less compliant in the compliance report for the first time period than indicated by the previous compliance report for the second earlier time period, and (b) the user-selected setting indicates a conditional reporting mode in which output messages are generated only if the compliance trend indicates that the one or more nodes are less compliant in the compliance report for the first time period than indicated by the previous compliance report for the second earlier time period.

10. The system of claim 9, wherein the generating further comprises generating the output message in a message format adapted for the STEM or logging tool.

11. The system of claim 9, wherein the compliance results are provided by respective software agents that are running at the one or more nodes and that are configured to detect changes at the one or more nodes.

12. The system of claim 9, wherein the compliance results comprise data identifying a name of a node that has changed and data identifying a name of a policy that detected the changed node.

* * * * *